(12) United States Patent  
Schulz et al.

(10) Patent No.: US 6,220,984 B1  
(45) Date of Patent: Apr. 24, 2001

(54) PLANETARY GEAR

(75) Inventors: Horst Schulz, Friedrichshafen; Jürgen Pescheck, Immenstaad, both of (DE)

(73) Assignee: 2F Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/402,042

(22) PCT Filed: May 9, 1998

(86) PCT No.: PCT/EP98/02724

§ 371 Date: Sep. 27, 1999

§ 102(e) Date: Sep. 27, 1999

(87) PCT Pub. No.: WO98/51943

PCT Pub. Date: Nov. 19, 1998

(30) Foreign Application Priority Data

May 15, 1997 (DE) .............................................. 197 20 255

(51) Int. Cl.$^7$ .................................................. F16H 57/08
(52) U.S. Cl. .......................... 475/340; 475/342; 475/344; 475/348
(58) Field of Search ................................... 475/338, 339, 475/340, 341, 342, 344, 348, 330, 313, 319

(56) References Cited

U.S. PATENT DOCUMENTS

| | | | | |
|---|---|---|---|---|
| 1,015,477 | * | 1/1912 | Conant | 475/340 X |
| 1,372,866 | | 3/1921 | Day . | |
| 1,499,763 | * | 7/1924 | Davis | 475/341 B X |
| 1,859,462 | * | 5/1932 | Perkins | 475/334 |
| 2,231,784 | * | 2/1941 | Thungen | 475/339 X |
| 2,512,349 | | 6/1950 | Loveland | 74/751 |
| 2,748,623 | * | 6/1956 | Hill | 475/141 |
| 2,800,036 | * | 7/1957 | Miller | 475/338 X |
| 2,804,785 | * | 9/1957 | Mendez | 475/338 |
| 2,892,361 | * | 6/1959 | Miller | 475/338 X |
| 2,950,635 | * | 8/1960 | Bieger et al. | 475/338 |
| 3,120,764 | * | 2/1964 | Berlinger et al. | 475/338 |
| 3,144,790 | * | 8/1964 | Davis et al. | 475/338 |
| 3,330,171 | * | 7/1967 | Nasvytis | 475/338 X |
| 4,142,426 | * | 3/1979 | Baranyi | 475/340 |
| 4,196,889 | * | 4/1980 | Dudek | 475/319 X |
| 4,567,787 | * | 2/1986 | Smith | 475/76 |
| 4,892,011 | * | 1/1990 | Nishida et al. | 475/159 |
| 5,062,824 | * | 11/1991 | Prokopius | 475/342 |
| 5,242,336 | * | 9/1993 | Hori | 475/336 |
| 5,295,925 | * | 3/1994 | Hirabayashi | 475/337 X |
| 5,910,066 | * | 6/1999 | Schulz et al. | 475/336 |

FOREIGN PATENT DOCUMENTS

| | | |
|---|---|---|
| 385431 | 11/1923 | (DE) . |
| 723405 | 8/1942 | (DE) . |
| 1937551 | 4/1966 | (DE) . |
| 27 34 487 | 3/1978 | (DE) . |
| 43 25 295 A1 | 2/1995 | (DE) . |
| 636367 | 4/1928 | (FR) . |
| 1057033 | 2/1967 | (GB) . |
| 97/04249 | 2/1997 | (WO) . |
| 97/27410 | 7/1997 | (WO) . |

\* cited by examiner

*Primary Examiner*—Charles A Marmor  
*Assistant Examiner*—Ha Ho  
(74) *Attorney, Agent, or Firm*—Davis & Bujold, P.L.L.C.

(57) ABSTRACT

The planetary gear according to the invention comprises a sun gear (2) connected to a driven central shaft (20), a ring gear (12), a group of first stepped planetary gears (8, 10) and a group of second stepped planetary gears (4, 6). The large step wheels (4) of the second stepped planetary gears engage the sun gear (2), the small step wheels (6) of the second stepped planetary gears simultaneously engage a pair of adjoining large step wheels (8) of the first stepped planetary gears and all small step wheels (10) of the first stepped planetary gears engage the ring gear (12). The gear allows for high transmission ratios having a small size and low inertia moment and offers excellent properties in relation to efficiency and transmission reliability.

34 Claims, 10 Drawing Sheets

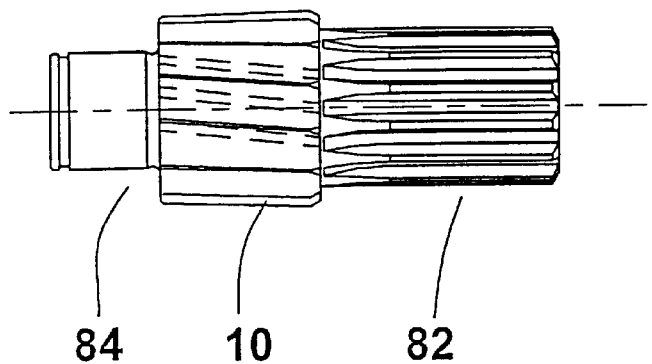
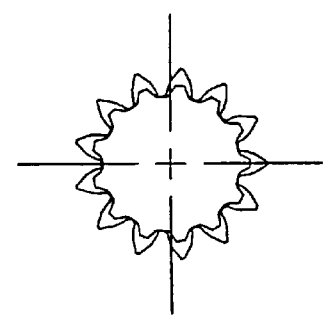
84   10   82
Fig. 12
Fig. 13

PLANETARY GEAR

BACKGROUND OF THE INVENTION

The invention relates to a planetary gear having a sun gear connected with a driven central shaft, a geared wheel, a group of first stepped planetary gears, a group of second stepped planetary gears, wherein all stepped planetary gears are supported on a common planet carrier, the number of the second stepped planetary gears corresponds to half the number of the first stepped planetary gears, the large step wheels of the second planetary gears engage the sun gear, the small step wheels of the second stepped planetary gears simultaneously engage one pair of adjoining large step wheels of the first stepped planetary gear and all small step wheels of the first stepped planetary gear engage the ring gear.

A planetary gear of this type has been described in the applicant's not published international application PCT/EP97/00288. The gear is designed as a so-called Wolfrom gear and, in particular, is very adequate for the production of very high total speed ratios with a good utilization of installation space. It further stands out by a high transmission quality, high efficiency and relatively low inertia moment, and by easy assemblage and low production costs.

U.S. Pat. No. 1,499,762 has disclosed a Wolfrom gear with stepped planetary gears in which the geared wheels have conical design and the planetary axles extend radially inclined toward the gear main axle.

Wolfrom gears are distinguished above all by high speed ratios with a very compact type of construction, but Wolfrom gears also have a few disadvantage basically conditioned. On the teeth (ring gears and the planets engaging the geared wheels) at the output are under a high torque load, elevated rotation speeds and relative speeds. This leads to elevated idle power requirements, reduced efficiency and under certain operating conditions to problems with vibration and noise. The planet carrier moving at relatively high rotational speed contributes to a substantial inertia moment of the gear. A high inertia moment produces high reaction torques in the event of abrupt changes in rotational speed.

Although compared to the Wolfrom gears, spur gear drives have more efficiency; they do not attain the great space and moment compactness of planetary gears. Other disadvantages of spur gear drives, compared to planetary gears, are that they are not well-suited to coaxial arrangement of input and output, and that pitch errors in the teeth of each wheel of a gear chain fully affect the transmission quality between input and output.

With conventional one-step planetary gears only with limitations, is it possible to implement very high speed ratios, due to problems with the tooth geometry in the very small gears needed therefor.

Already known planetary gears with several planet steps, connected in series, have a great number of parts and a large axial space.

The problem to be solved by the invention is to obtain high speed ratios with great space and moment compactness, to clearly improve the transmission quality and efficiency and at the same time to reduce the inertia moment and the tendency to vibration. In addition, the gear must be favorably produced and require no great assemblage expenditure.

SUMMARY OF THE INVENTION

The problem is solved by a planetary gear having a sun gear (2) connected with a driven central shaft (20), a ring gear (12), a group of first stepped planetary gears (8, 10), a group of second stepped planetary gears (4, 6) wherein all stepped planetary gears are supported in a common planet carrier (24), the number of the second stepped planetary gears (4, 6) corresponding to half the number of the first stepped planetary gears (8, 10), the large step wheels (4) of the second stepped planetary gears engage the sun gear (2), the small step wheels (6) of the second stepped planetary gears engage simultaneously one pair of adjacent large step wheels (8) of the first stepped planetary gears, all small step wheels (10) of the first stepped planetary gears engage the ring gear (12), the planet carrier (24) being the gear output and the ring gear (12) the supporting element. Advantageous developments and other embodiments of the invention are given in the sub-claims.

The input torque is distributed by the sun gear; first among several large step wheels of the second stepped planetary gears. After the speed ratio by the second stepped planetary gears, the torque is again distributed by the small step wheels of the second stepped planetary gears among double the number of tooth engagements than with the first stepped planetary gears. According to the speed ratio step, as the torque increases so does advantageously increase the number of tooth engagements to which said torque is distributed. A very uniform load distribution is achieved.

The gear parts, loaded with high torque, which rotate slowly because of their necessary dimension, take a high portion on the total transmission volume. No gear parts, moving at high speed, are exposed to a high torque load and, therefore, are accordingly lightly constructed. For the gear, a very low inertia moment altogether results therefrom.

Low peripheral speeds on the teeth make possible the use of compact, quick revolving prime movers.

In addition, the arrangement by pairs of the first stepped planetary gears results in an easy adaptation to different torques to be transmitted with many equal parts. For higher torques, one other pair of first stepped planetary gears with another pair of second stepped planetary gears are simply placed on the planet carrier.

A gear, according to the invention, has the advantage of making possible high speed ratios in a narrow space with small internal rolling outputs. Thereby it has a high degree of efficiency. Starting and other friction torques remain small. Besides, the low rolling outputs have a positive effect on the noise characteristic, as does the stability of the slight gear play during the service life.

In the embodiment as planetary gear, the further advantage obtained in the substantially horizontal position of the gear main axle, with a partial oil filling of the gear, is that the stepped planetary gears are regularly immersed in oil while the planet carrier rotates. All teeth and planetary bearings are in this manner optimally lubricated.

In the alternative embodiment, the gear has a total speed ratio higher by 1. In this embodiment, the input and output shafts rotate in the same direction.

By virtue of advantageous development, wherein the connecting lines (14, 16) from the wheel central point of a small step wheel (6) of a second stepped planetary gears to the wheel central points of the two adjacent large step wheels (8) of the first stepped planetary gears form an angle (18) of between 180° and 195°, there results extensively weighed off teeth forces on the small step wheels of the second stepped planetary gears whereby the support thereof is easier and simpler. The exact angle for the arrangement of the second stepped planetary gears can be selected according to the assemblage conditions.

A ring gear of conical design, combined with an axial adjustability of the ring gear in relation to the first stepped planetary gears along the gear main axle, makes good adjustability of the play between teeth of the small step wheels of the first stepped planetary and the ring gear possible.

With the development according to claim 5, the advantage is obtained that an axial play of the bearings of the first stepped planetary gears does not affect the total play of the gear. An exact axial position is not required. The adjustment expenditure is thus reduced and a small gear play is attained.

Another advantageous possibility of the small step wheels to the conicity of the geared, wheel is wherein the small step wheels (10) of the first stepped planetary gears have a conical design and the axles of rotation of the first stepped planetary gears are parallel to the main axle of the gear. In this case, the planet carrier is easier to make since no inclined planetary axles are needed.

The cylindrical ring gear, internally cylindrical, is advantageously easy to produce and does not require adjustment as to its axial position. The large and expensive spacers for the geared wheel can thus be spared.

With an additional feature, wherein the small step wheels (10) of the first stepped planetary gears are of conical design and the axles of rotation of the first stepped planetary gears (8, 10) are radially inclined toward the gear main axle forming an angle, it is possible to adjust the teeth play by adjusting the axial position of the first stepped planetary gears along their inclined axis of rotation. The small spacers needed for this, which are axially disposed between planetary bearings and planet carrier, are substantially more economical than the large spacers needed for the geared wheel.

The development of the large step wheels, wherein the large step wheels (8) of the first stepped planetary gears have a conical design and have the same conical direction as the small step wheels (10) of the first stepped planetary gears, makes an easy assemblage possible, whereas the development, wherein the large step wheels (8) of the first stepped planetary gears have a conical design and have a conical direction opposite to the small step wheels (10) of the first stepped planetary gears, attains a compensation of the axial force with the advantage of slighter supporting forces.

The number of conical teeth, expensive to produce, can be reduced by means of the development, wherein the large step wheels (4, 8) of at least one group of stepped planetary gears are of almost cylindrical design and the wheels (2, 6) engaging the step wheels are of conical design.

A kinematically exact engagement of the teeth of the stepped planetary gears is obtained by the feature, wherein all planetary axles and the gear main axle intersect at a common point. wn the case of axles of the stepped planetary gears parallel to the gear main axle, the common intersection point is a t infinity.

The advantages of helical cut teeth are more precise, less noisy motion and slight vibrations.

At least a partial compensation of the axial forces, produced by the helical cut teeth in the stepped planetary gears, is obtained by the features wherein both step wheels of at least one group of stepped planetary gears are helical cut and the helix angles of the teeth of both step wheels have equal sense of direction.

An almost complete compensation is attained when the condition is met, wherein the ratio of the tangent of the helix angles is substantially equal to the diameter ratio of the pitch circle of the step wheels of the stepped planetary gears, especially in combination with cylindrical step wheels, a self-adjustment of the axial position is made possible. In this case, an axial support of the stepped planetary gears concerned can be completely omitted.

The second stepped planetary gears (4, 6) occupy essentially the same axial space claimed already by the first stepped planetary gears (8, 10) and particularly with the added development, wherein the large step wheels (8) of the first stepped planetary gears are situated axially on one side of the ring gear (12a) and the large step wheels(4) of the second stepped planetary gears are situated axially on the other side of the ring gear (12a), the development makes a very great space and torque compactness possible.

Several advantages are attained by the floating support, wherein the two stepped planetary gears (4, 6) are supported in the planet carrier (24) by floating support of the small step wheels (6) between each two large step wheels (8) of the first stepped planetary gears and each by one other with axial distance from bearing (22). The driven central shaft (20) is supported by floating support of the sun gear (2) between the large step wheels (4) of the second stepped planetary gears an by one other with axial distance from bearing (22). Quite evidently, it is possible thereby to spare the otherwise needed bearings (e.g. roller bearings) and thus space, costs and assemblage expenditure. Besides, on the floatingly supported wheels, conditioned by the engagement by pairs, a compensation takes place of pitch errors still existing even in precision gears and conditioned by manufacture. Thus, this development positively affects the transmission reliability and the vibration characteristic of the gear. Due to the angular mobility of the axial distance from the bearing, which normally always exists to a small extent, there additionally takes place a self-centering in the tooth engagements and thus a load compensation between tooth engagements of the stepped planetary gears. The floating support of the small step wheels of the second stepped planetary gears is only made possible by the arrangement in pairs according to the invention of each two first stepped planetary gears.

A single main axle, wherein between supporting element and gear output, a main bearing (34) is situated which absorbs the operating forces, makes a compact shape and an easy assemblage possible.

By an integration of the bearing races in the ring gear and the planet carrier, space is clearly spared so that more space is available to implement a high speed ratio with spatial accommodation of all wheels within a narrow space.

A two-part design of the ring gear has a first inner toothed part (12a) and a second part (12b) with incorporated rolling body race, This makes an axial adjustability of the ring gear possible in relation to the planet carrier and a separate production of the parts. In this manner, the requirements of different hardness penetration depths of the teeth and the gearing races can advantageously be taken into account.

A cross roller bearing as main bearing, wherein the said main bearing (34) is designed as cross roller bearing, has the advantage of a high load capacity, especially with regard to tipping torques, with high precision at the same time.

By the feature wherein the relative rotating position of the large and small step wheels of respectively at least one of the stepped planetary gears, the large step wheels of which simultaneously engage one wheel situated between the step wheels, is adjustable at least once, it is possible to reduce the production costs of teeth coordinated with each other. In the selection of tooth numbers, complicated assemblage conditions need not be considered. Besides, the number of parts to be adjusted is minimized.

The development, wherein the relative rotating position of the large and small step wheels of one stepped planetary gear is adjustable during the assemblage by gluing and/or thermal shrink fitting of one step wheel upon a shaft firmly connected with the other step wheel. This has the advantage of a lower number of parts, whereas the development, wherein the relative rotating position of the large and small step wheels of one stepped planetary gear is adjustable by means of a releasable flange connection in which the fastening elements (42) have in loose state a tangential play in associated through bores (43). This allows an exchangeability of individual parts and makes subsequent corrections of the position coordination possible. Insofar as it is not necessary to adjust the relative rotating position of the step wheels of a stepped planetary gear, the stepped planetary gears can be produced in one piece. But for reasons of functional efficiency, it can also be advantageous in this case to make up the stepped planetary gears of several parts.

The number of teeth of the adjustable step wheel (8) cannot be integrally divided by the number of through bores (43). Further development ensures that defined coordination of through bores and screw-in threads exists.

A first part of a two-part stepped planetary gear (4, 6, 8, 10) has a toothed shaft prolongation (82) for interlocking connection with an inner toothed hub of a large step wheel (4, 8), the teeth of the shaft prolongation has the same number of teeth as the meshing teeth of the small step wheel (6, 10) and the tooth gaps of both teeth are substantially equal in position in the transition area. A two-part development of a stepped planetary gear offers advantages in the production of a specific position coordination of the two stepped wheels of a stepped planetary gear. The interlocking connection can be advantageously produced as shaft spline connection, but a spline profile connection is also possible. A connection without play and axially stationary of the step wheels can be produced by a small excess of the toothed shaft prolongations and thermal joining or by the use of adhesive.

BRIEF DESCRIPTION OF THE DRAWING(S)

The assemblage is simplified by the feature, wherein at least one group of stepped planetary gears (8, 10, 4, 6) the number of teeth of the large step wheels (8, 4) can be divided integrally by the number of teeth of the small step wheels (10, 6). This is true, especially in the case of stepped planetary gears with firm relative rotational position coordination between the step wheels, in assembling the first stepped planetary gears, it needs not be considered, e.g. which tooth of the small step wheel engages the ring gear.

For example, a hollow central shaft makes a central passage possible through which a cable strand can be passed.

A more uniform loading of the ring gear can be obtained when more than two pairs of first stepped planetary gears simultaneously engage the ring gear. By respectively adding one pair of first stepped planetary gears and a second stepped planetary gear, high loading requirements can be met with only a few changes (on the planet carrier).

By the arrangement of the pairs of first stepped planetary gears, wherein the connecting lines of the wheel central points of two first stepped gears that form one pair to the wheel central point of said sun gear (gear main axle) form an angle of less than 90°, different advantages are obtained. Combined with a large sun gear, the central passage can be made substantially larger. Depending on load requirements, it is possibly easier to distribute other pairs of first stepped planetary gears with associated second stepped planetary gears on the inner periphery of the ring gear.

The embodiment makes it possible to eccentrically place the prime mover and thus keep the central passage free. In addition, the spur tear step makes a ** possible so that, even at the speed ratio of the planetary gear limited by the large sun gear, it is possible to achieve a high total speed ratio.

DESCRIPTION OF THE PREFERRED EMBODIMENT(S)

The development, wherein one bushing (50) is situated in the hollow central shaft (20), with a bushing which can be non-rotatably connected with the supporting element or the output, has the advantage that the high number of revolutions of the sun gear do not appear in the central passage. In this manner, damages are prevented on passed through cable strands, for example.

The lesser a tooth play is adjusted, the better the transmission reliability of the gear, but the greater the danger of jamming. Due to thermal deformations and wear, the tooth play is not adjustable as small as desired. The development wherein the first stepped planetary gears (8, 10) are axially movably supported along their planetary axles in the planet carrier (24) and one spring element (56) for transmission of an axial force that compensates the teeth play is situated between first stepped planetary gear and planet carrier. This has the advantage that the teeth play in normal operating moments is always zero during the whole service life of the gear and a jamming is thereby prevented, that a stepped planetary gear can carry out an axial deflection motion upon occurrence of too strong teeth forces produced, e.g. by pitch error in the teeth of the ring gear.

The spring tension is conveniently selected so that it can compensate in a partial load range the axial teeth forces increasing in proportion to the torque.

The spring element is a prestressable coil spring (56) which is situated in a bore (62) in the stepped planetary gear (8, 10) between a supporting element (70) fastened in the stepped planetary gear and one other supporting element (68) axially coupled with the planet carrier (24), and an adjusting device is provided for setting a maximum pitch of spring. The other development is very space saving. The adjustment device makes predetermining the maximum pitch of spring possible.

The spring element is a prestressable coil spring (56) which is situated in a bore (62) in the stepped planetary gear (8, 10) between a supporting element (70) fastened in the stepped planetary gear and one other supporting element (68) axially coupled with the planet carrier (24), and an adjusting device is provided for setting a maximum pitch of spring. The other development is very space saving. The adjustment device makes predetermining the maximum pitch of spring possible.

The invention is described in detail herebelow in relation to the enclosed draws.

FIG. 12 is a sideview of a first part of a two-part stepped planetary gear; and

FIG. 13 is a front view of a first part of a two-part stepped planetary gear.

In the figures the same reference numerals have been given to positions corresponding to each other.

Figure 1:
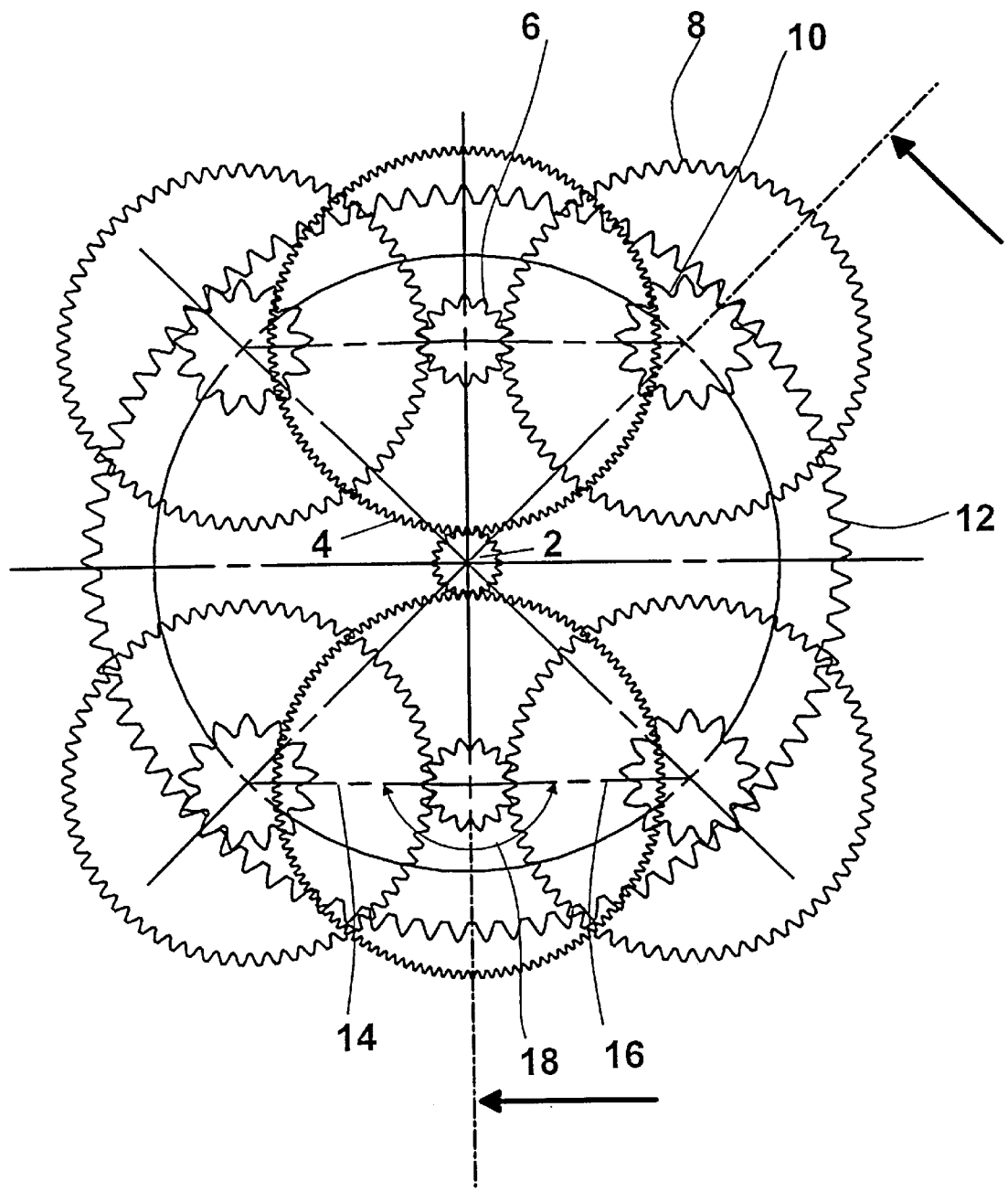
FIG. 1 is basic representation of the wheel arrangement of a planetary gear according to the invention.

The basic representation in FIG. 1, symmetrical relative to the horizontal and vertical central planes, shows the central sun gear 2 which in an axial plane engages several large step wheels 4 of the second stepped planetary gear. In another plane, the small step wheels 6 of the second stepped planetary gear simultaneously engage one pair of adjacent large step wheels 8 of the first stepped planetary gear. In a third plane, all small step wheels 10 of the first stepped planetary gear engage the ring gear 12. Unlike the traditional planetary gears in which sun gear and ring gear must have the same module, it is possible in the gear, according to the invention, to optimally select the module for each individual speed ratio step. Particularly in the first step between sun gear 2 and large step wheels 4 of the second stepped planetary gear, where there can be greater differences in diameters of the wheels, a finer pitch or a higher number of teeth, as shown, is advantageous to avert problems relative to the tooth shape such as undercut and/or pointed teeth. In the other steps, strong teeth forces appear at low number of revolutions so that a coarse pitch is advantageous.

With the arrangement high speed ratios can be achieved. It is advantageous that on several places the torque flow divides in each (here) in two paths. Thereby a uniform load distribution and a compensation of eventual pitch errors are obtained.

In FIG. 1 can also be seen that the connecting lines 14 and 16 of the wheel central point of a small step wheel 6 of the second stepped planetary gear to the wheel central points of the two adjoining large step wheels 2 of the first stepped planetary gear form an angle 18 between 180° and 195°. The extensively symmetrical arrangement, respective of the sun gear 2 and of the small step wheels 6 of the second stepped planetary gear between large step wheels 4 and 8, makes a space-saving floating support of the wheels involved in the tooth engagements possible.

All step wheels move at the slow angular speed of the planet carrier (not shown in FIG. 1) around the gear main axle when the planet carrier is the gear output. The inertia moment remains altogether very small.

Figure 2:
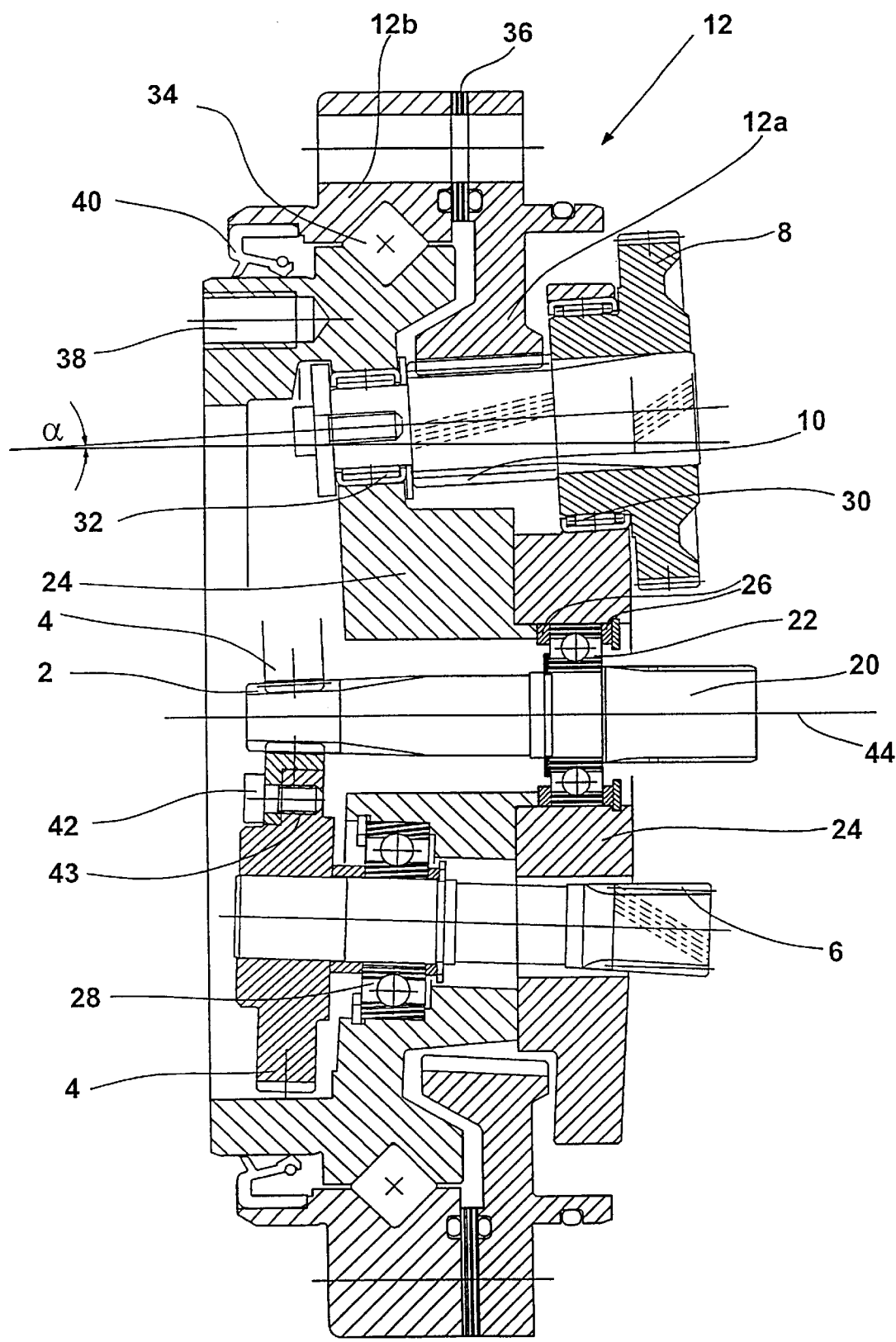
FIG. 2 is a transverse section of one embodiment with inclined stepped planetary gear axles according to the invention.

According to the invention, FIG. 2 shows a transverse section of a gear. The sectional curve is indicated in FIG. 1 by arrows. In the planetary gear shown in FIG. 2, the teeth of the sun gear 2 is integrated in the driven central shaft 20. The driven central shaft 20 is supported by floating support of the sun gear 2 between the large step wheels 4 of the second stepped planetary gears and with axial distance from bearing 22 in the planet carrier 24. Having a conical design, the sun gear 2 simultaneously engages the large step wheels 4 of the second stepped planetary gear. By means of spacers 26 can be adjusted the axial position of the driven central shaft 20 in the planet carrier 24 and thus the teeth play between sun gear 2 and large step wheels 4 of the second stepped planetary gear.

The second stepped planetary gears with the large step wheels 4 and the small step wheels 6, in turn, are supported by floating support of the small step wheels 6 between the large step wheels 8 of the first stepped planetary gear and by one other with axial distance from bearing 28 in the planet carrier 24, respectively.

As can be seen in FIG. 2, the second stepped planetary gear occupies the same axial space in a substantial place-saving manner, which had already been claimed by the first stepped planetary gear. Among other things, this is made possible by the fact that the large step wheels 4, 8 of the stepped planetary gear are not all axially disposed on one side of the ring gear 12a but on both sides of the ring gear.

The large step wheels 4 of the second stepped planetary gear are designed approximately cylindrical. Thereby is obtained the advantage that an axial displacement of a second stepped planetary gear, along its radially inclined planetary axle, has no effect upon the teeth play between sun gear 2 and large step wheels 4 of the second stepped planetary gear. The small step wheel 6 of the second stepped planetary gear simultaneously engages one pair of adjacent large step wheels 8 of the first stepped planetary gears.

The radial inclination of the stepped planetary gears, indicated by the angle $\alpha$, is selected so that the prolongations of the planetary gear axles of the first and second stepped planetary gears intersect at a common point in prolongation of the gear main axle.

In the embodiment shown in FIG. 2, both step wheels 8, 10 of the first stepped planetary gears are cylindrical. The ring gear 12a internally has a conical design corresponding to the radial inclination of the planetary axle of the first stepped planetary gears. An axial displacement of the first stepped planetary gears, along the planetary axle, thus has no effect upon the teeth play between the small steps wheels 10 of the first stepped planetary gears and the ring gear 12a.

The helix angles of the teeth of the large and small step wheels of the first stepped planetary gears 8, 10 are combined to result in a compensation of the axial forces originating from the helical teeth. Therefore in this example, the axial position of the first stepped planetary gears is self-adjusting and without effect upon the teeth play between small step wheels 10 and ring gear 12a. It is also advantageous that no axial support is needed for the first stepped planetary gears and the support is implemented with space-saving needle bearings 30, 32.

The teeth play between small step wheel 10 of the first stepped planetary gears and ring gear 12 can be adjusted by axial displacement of the internally toothed part of the ring gear 12a relative to the planet carrier 24. For this purpose in the embodiment shown in FIG. 2, the geared wheel 12 is composed of one internally toothed part of the ring gear 12a and a part 12b that accommodates the main bearing 34. Therefore in the embodiment shown, part 12b is, at the same time, the outer ring of an integrated cross roller gearing. The axial space between the parts 12a, 12b and thus the teeth play between small step wheels 10 of the first stepped planetary gears and ring gear 12a is adjustable by means of a spacer 36.

As can be seen in FIG. 2, the through bores for the bolts for connecting the parts 12a, 12b are not shown. The bearing races of the main bearing 34, designed as a cross roller bearing, are integrated in spacesaving manner in the parts 12, 24 concerned.

In the embodiment of FIG. 2 is provided that the ring gear 12 serve as supporting element and the planet carrier 24 as gear output. The threaded bores 38 distributed on the periphery serve to fasten parts to be driven. The seal 40 prevents the penetration of dirt in the gear and the leaking of lubricant. A gear housing is not shown in FIG. 2.

At least one large step wheel 4 of a second stepped planetary gear has distributed on the periphery bolts 42 of a flange connection. By means of said flange connection, the relative rotational position of the large step wheel 4 to the small step wheel 6 of the second stepped planetary gear can be adjusted. For this purpose, the corresponding bolt through bores 43 have an excess in tangential direction. By means of said flange connection, the exact position of the floatingly supported sun gear in the tooth engagements of the large step wheels 4 can be adjusted. In corresponding manner, the mutual rotational position of the small and large step wheels of at least one first stepped planetary gear is also adjustable. Between said large step wheels of the first stepped planetary gears, the small step wheels 6 of the second stepped planetary gear are floatingly mounted.

Figure 3:
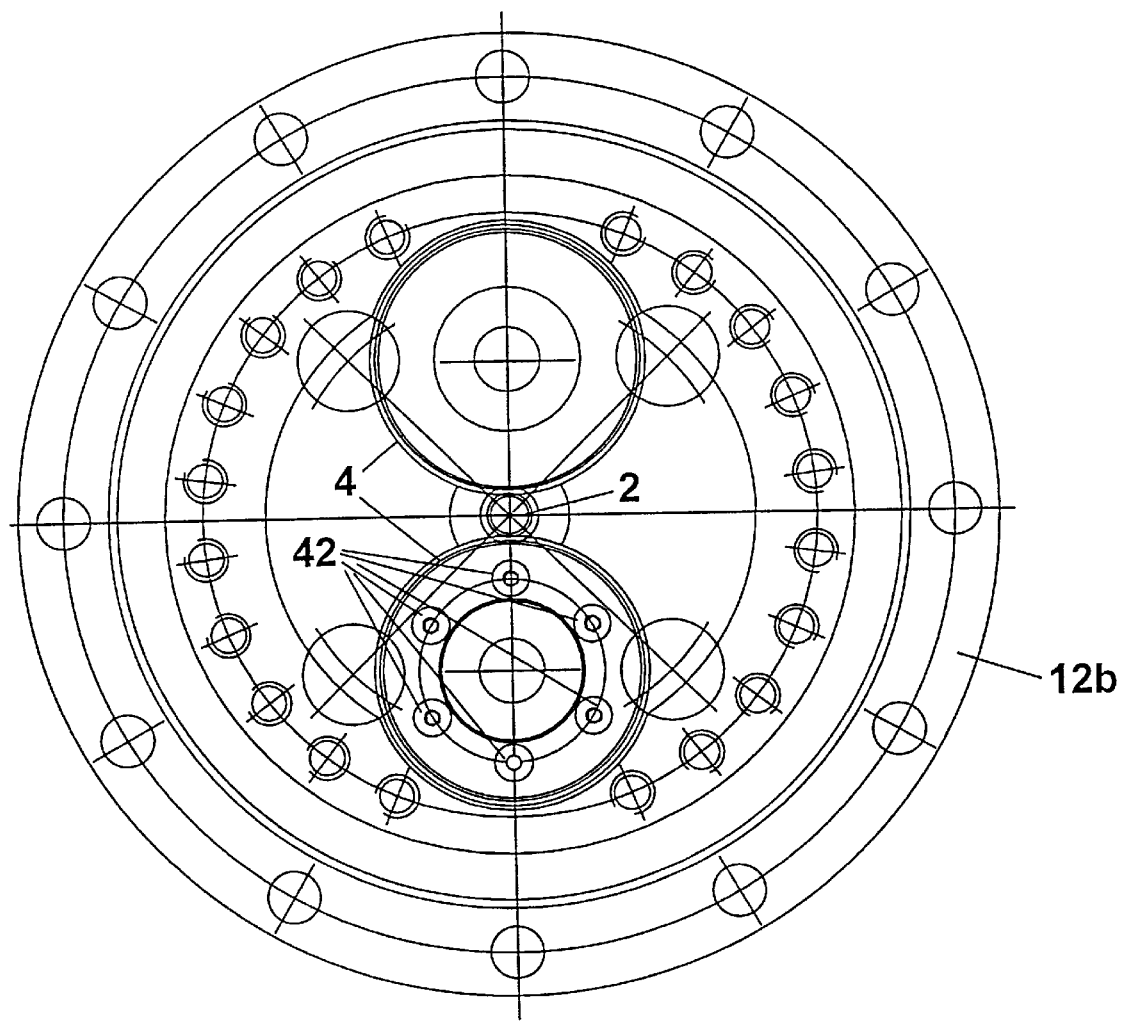
FIG. 3 is front view of the embodiment of FIG. 2.

FIG. 3 shows a front view on the output side of the gear shown in section in FIG. 2. Two large step wheels 4 of second stepped planetary gears, the bolts 42 of the flange connection and the bearing outer ring (ring gear) 12b are shown together with the sun gear 2.

Figure 4:
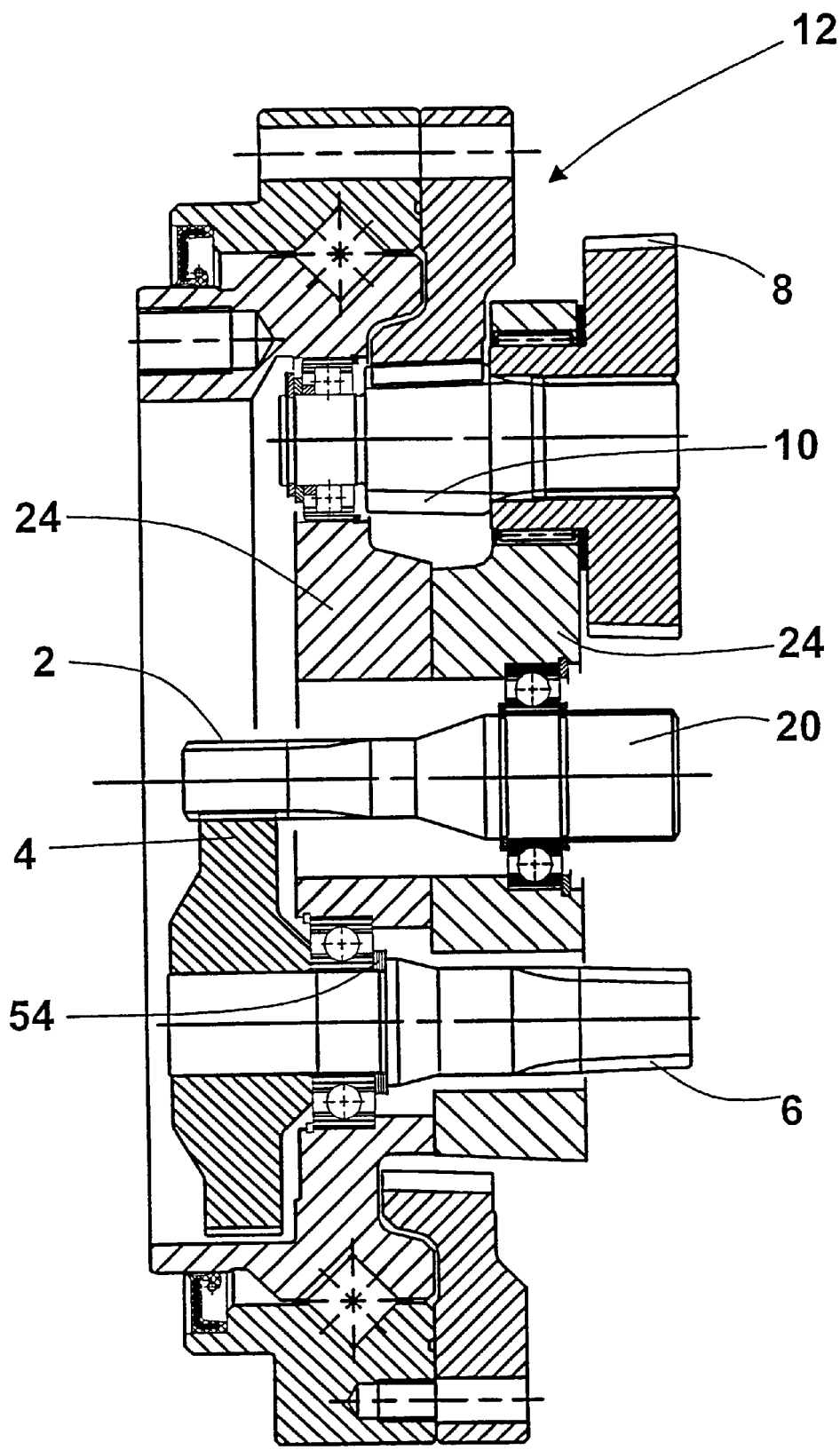
FIG. 4 is a transverse section of one other embodiment with parallel stepped planetary gear axles.

FIG. 4 shows one other embodiment of gear, according to the invention, in corresponding representation like FIG. 2. All planetary axles are here parallel to the main axle of the gear. The sun gear 2 and the large step wheels 4 of the second stepped planetary gears are cylindrical in design. The small step wheels 6 of the second stepped planetary gear and the step wheels 8, 10 of the first stepped planetary gear have a conical design the same as the ring gear 12. The large and small step wheels 8, 10 of the first stepped planetary gears have the same conical direction, which is advantageous with regard to an easy assemblage. The teeth play in the highspeed step between the sun gear 2 and the large step wheels 4 is not adjustable here, being designed structurally narrow. For this the axial position of sun gear 2 and large step wheels 4 of the second stepped planetary gears do not have to be adjusted. The teeth play between the conical step wheels 6, 8 is adjustable by adjusting the axial position of the second stepped planetary gears 4, 6 by means of spacers 54.

Figure 5:
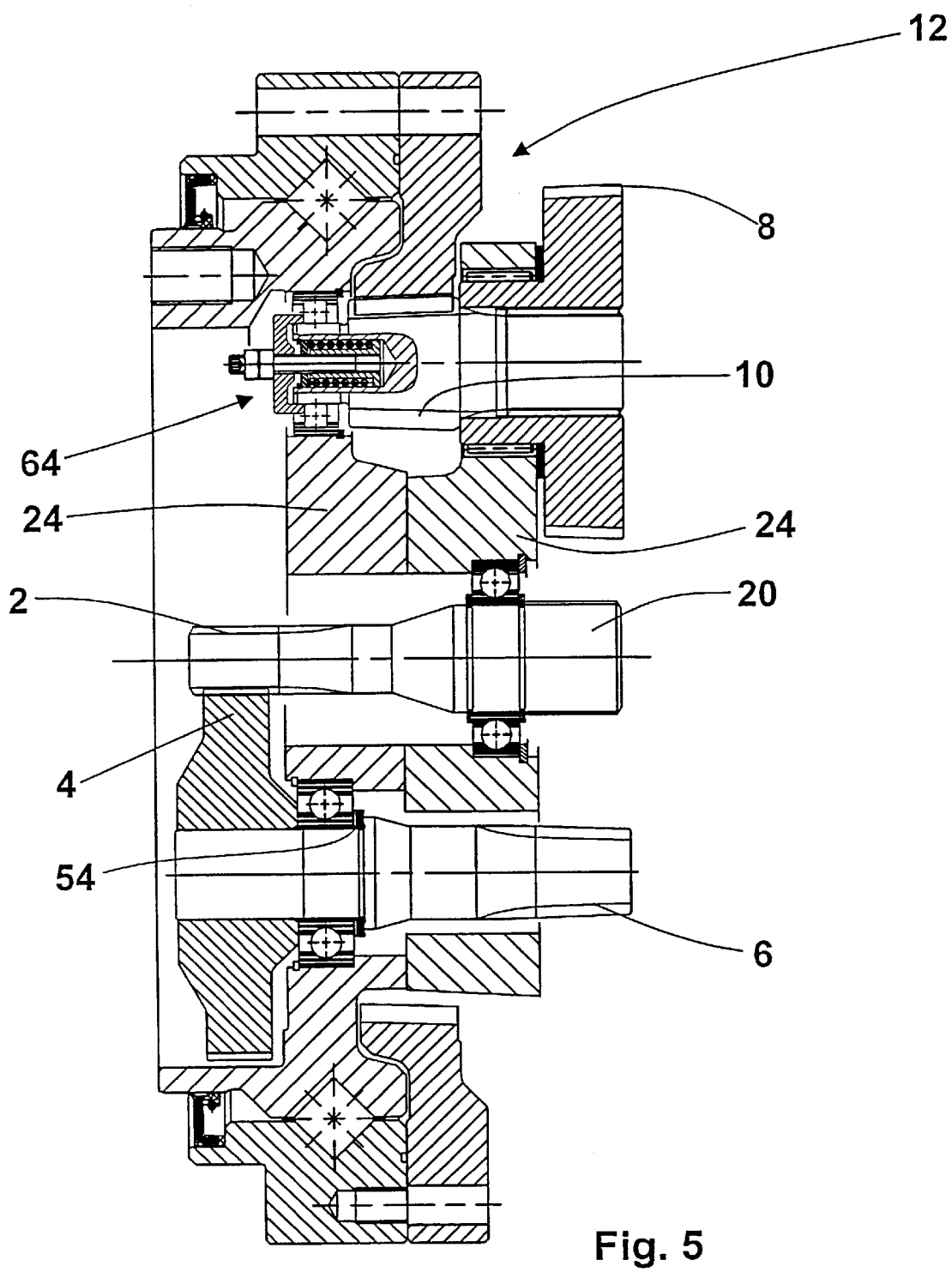
FIG. 5 is a transverse section of one embodiment with parallel stepped planetary gear axles and a spring arrangement between two stepped planetary gears and the planet carrier.
Figure 6:
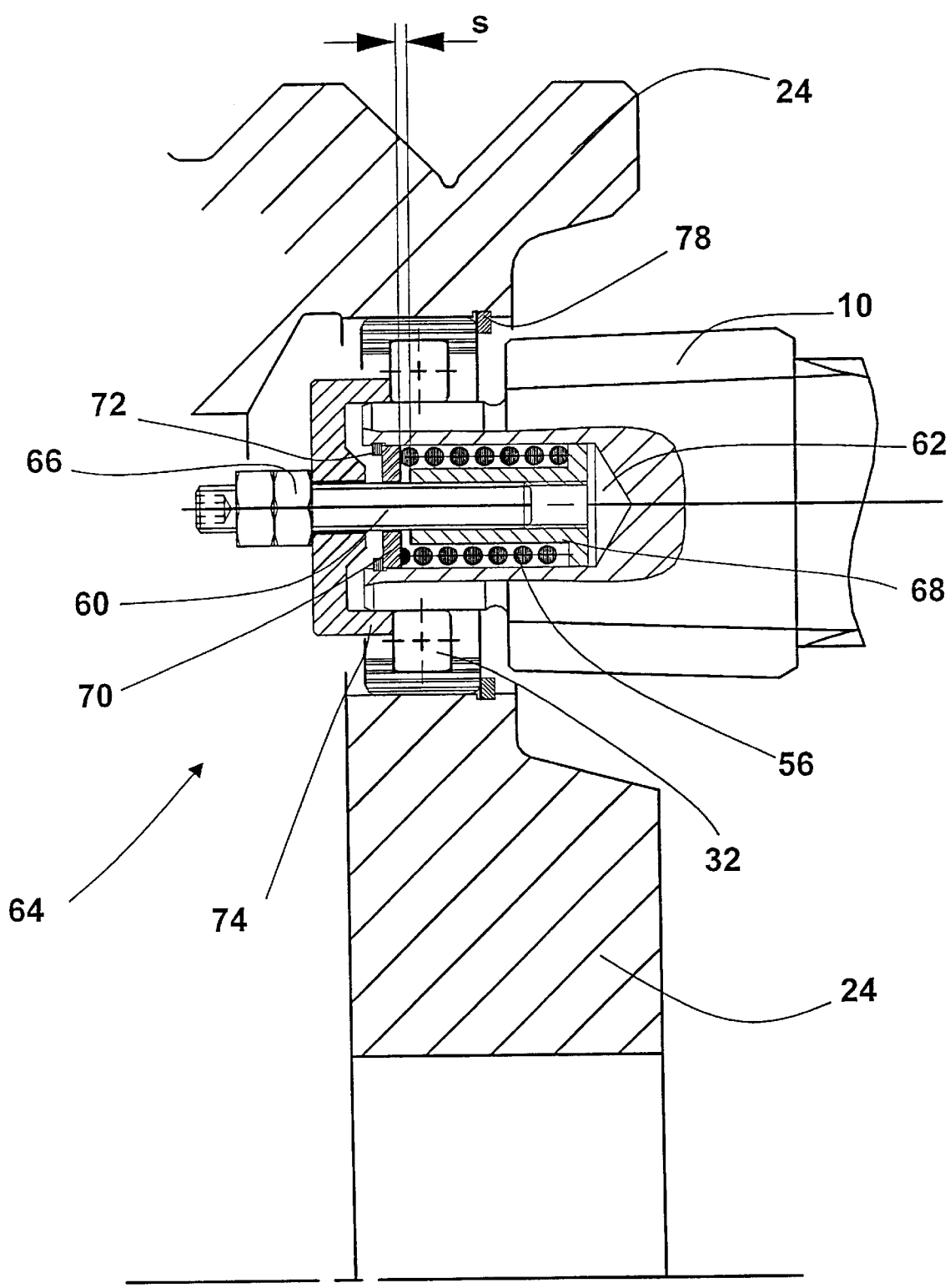
FIG. 6 is an enlarged representation of the spring arrangement between the second stepped planetary gears and the planet carrier.

As can be seen in FIG. 5, the embodiment differs from the embodiment of FIG. 4 by a spring arrangement 64 between second stepped planetary gears 8, 10 and the planet carrier 24 shown enlarged in FIG. 6.

The coil spring 56 is situated in the second stepped planetary gear in the bore 62 between a disc 70 secured by means of snap ring and a collar at the end of the sleeve 68. The sleeve 68 transmits the spring tension to threaded pin 60 firmly connected with the sleeve. The lid 74 is tensioned between a nut 66 screwed on the threaded pin and the front sides of the rolling body of the bearing 32. The outer ring of the bearing 32 is axially fixed by a snap ring 78 in the planet carrier 24. Between the stepped planetary gear and the planet carrier, the spring arrangement transmits a defined initial stressing force which retains without play the stepped planetary gears in the cone of the ring gear 12 (not shown in FIG. 6). Between the disc 79 and the sleeve 68, an axial gap s is provided. During operation, the effective axial position of the stepped planetary gear is subjected to a certain slight measure of deviation resulting from inevitable small pitch errors. The axial gap s is adjustable by the nut 66 to precisely cover said measure of deviation. The tension of the inserted spring 56 is adapted in a manner such that the axial forces of the teeth are covered only in partial load range. In case of high load, the step wheel migrates axially out up to the stop formed by the disc 70 and the bushing 68. The teeth play between stepped planetary gear and ring gear is eliminated. Effects due to temperature expansions or wear are compensated by the spring arrangement. Nevertheless jamming does not occur, even in case of pitch errors, since the stepped planetary gear in this case can perform an axial evading moment. The axial force, which causes said evading movement, results from the sum of forces from the helical teeth of the two step wheels which, when the helix angle has been adequately selected, advantageously compensate themselves and from the axial force appearing in radial loading of the teeth as a consequence of the conicity.

Figure 7:
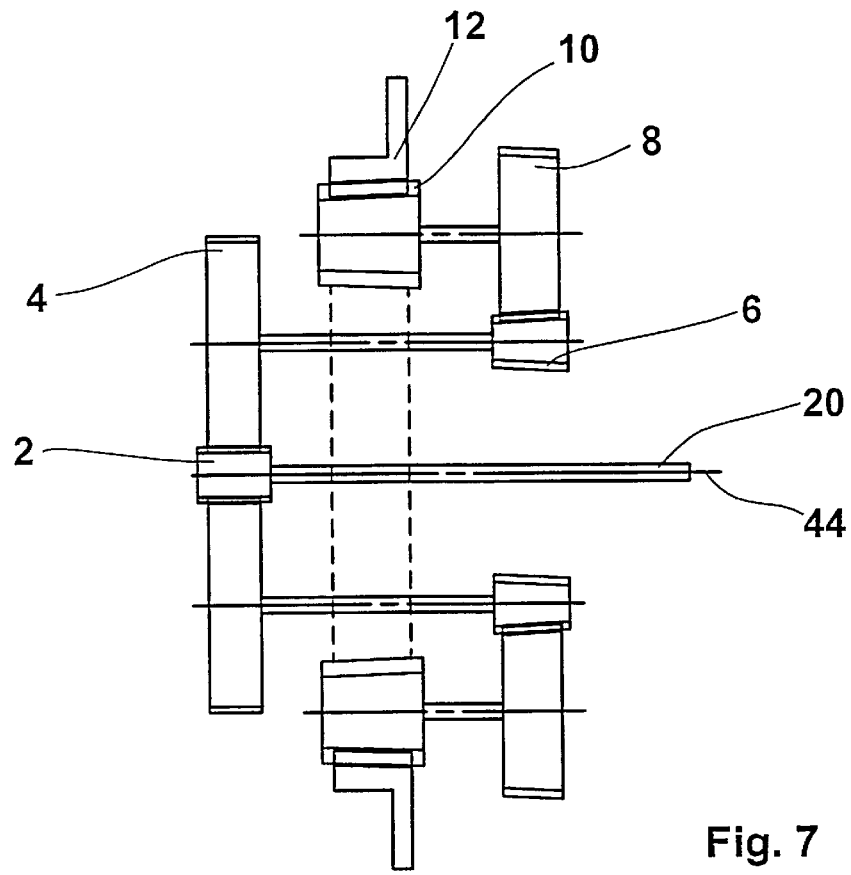
FIG. 7 is a basic representation of a possible arrangement of ring gear and first stepped planetary gears.
Figure 8:
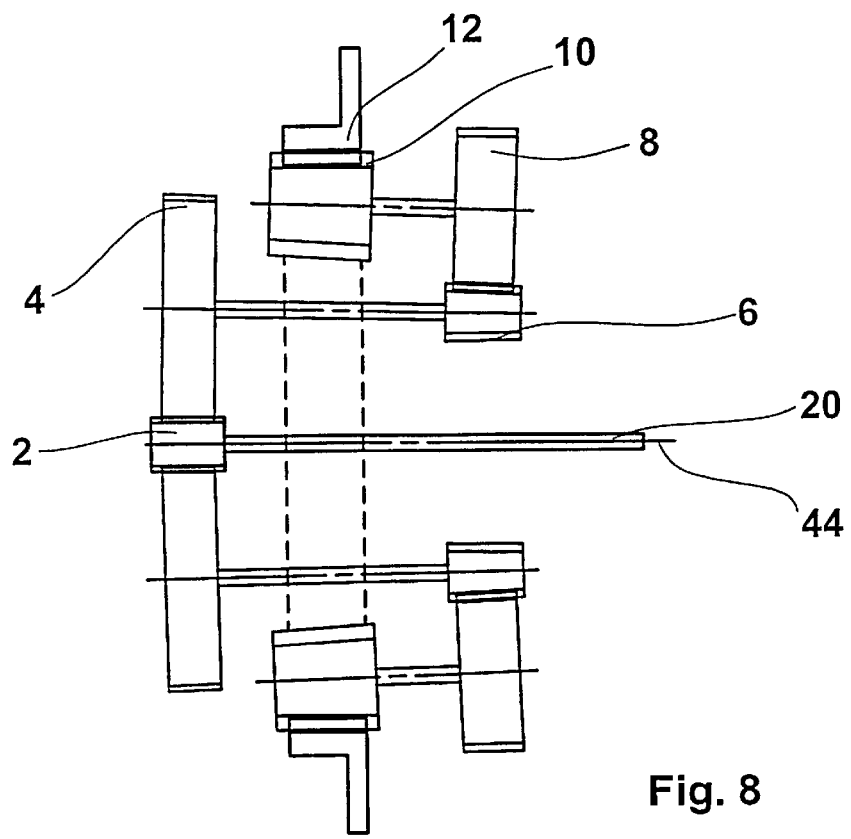
FIG. 8 is a basic representation of one other possible arrangement of ring gear and first stepped planetary gear.

As diagrammatically can be seen in FIGS. 7 and 8, added advantageous arrangements of first stepped planetary gears and ring gear 12. The central line 44 corresponds in these figures to the gear main axle. FIG. 7 shows an arrangement with conical ring gear 12, first stepped planetary gears 10, 8 parallel to the gear main axle and conical small and large step wheels of the first stepped planetary gears. The large and small step wheels have opposite conical directions. Axial forces originating from the conicity advantageously act in opposite directions. Besides, in this arrangement is made easier the adjustment of the teeth play of the teeth of the first stepped planetary gears.

As can be seen in FIG. 8, an arrangement with cylindrical ring gear 12, radially inclined planet axles of the first stepped planetary gears and correspondingly adapted conicity of the small step wheels 10 of the first stepped planetary gears. The teeth play, between small step wheel 10 and ring gear 12, is set by adjusting the axial position of the stepped planetary gears along their radially inclined axles. In this embodiment, the expensive, large spacers 36 for the ring gear 12 (FIG. 2) can be spared.

Figure 9:
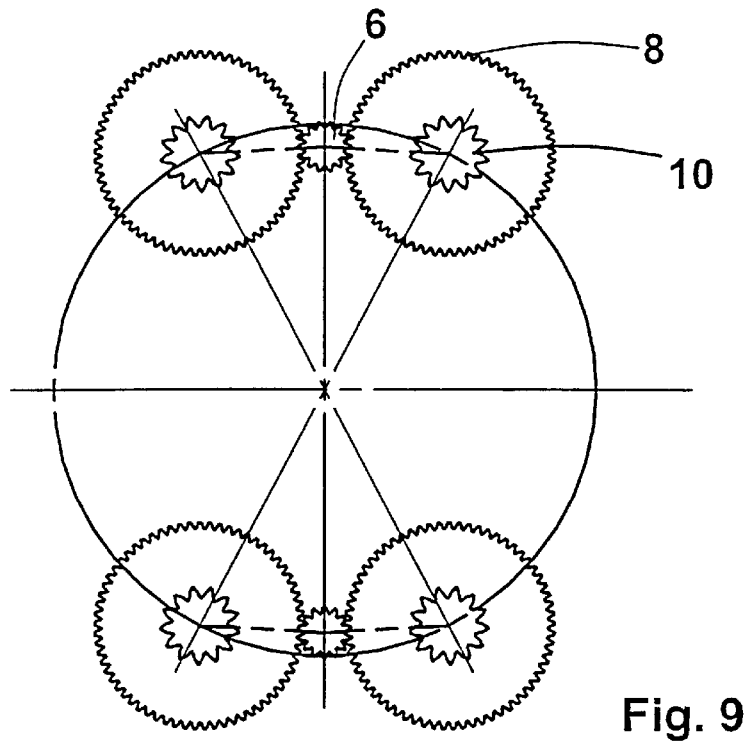
FIG. 9 is a basic representation of the wheel arrangement of one other planetary gear according to the invention with two pairs of first stepped planetary gears.
Figure 10:
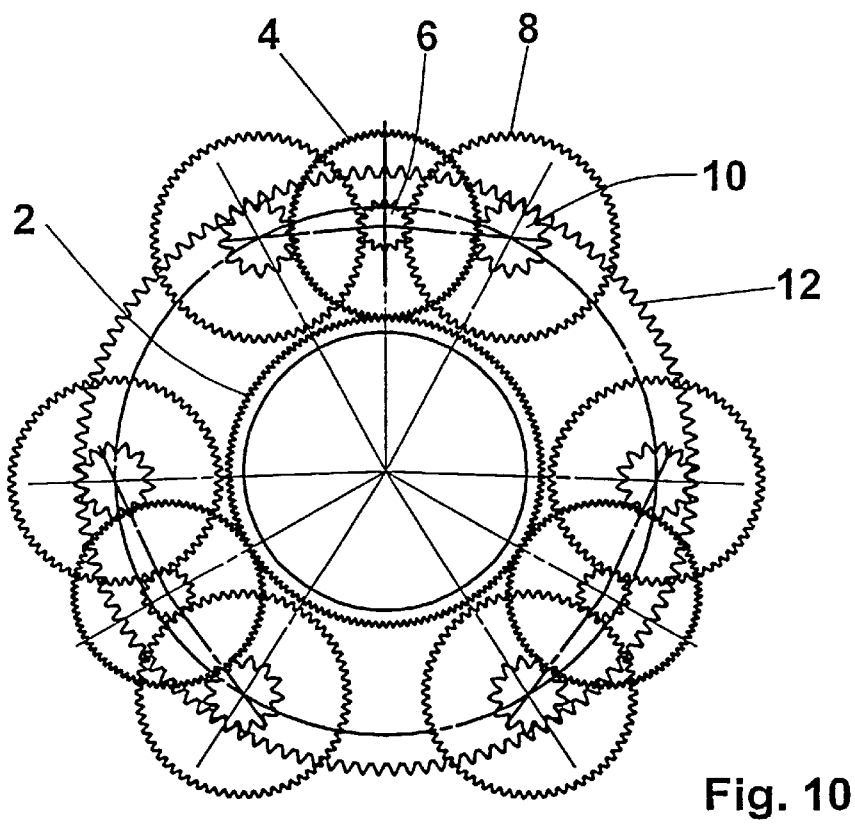
FIG. 10 is a basic representation of the wheel arrangement of one other planetary gear according to the invention with three pairs of first stepped planetary gears.

FIGS. 9 and 10 diagrammatically show other developments of the invention on which the connecting lines of the wheel central points of two first stepped planetary gears forming one pair to the wheel central point of the sun gear (gear main axle) form an angle of less than 90°. It is not necessary that said angle be an integral fraction of 360°. It can be 56.2°, for example.

FIG. 9 shows two pairs of first stepped planetary gears 8, 10 each having between a small step wheel 6 of a second stepped planetary gear (ring gear, sun gear and large step wheels of the second stepped planetary gears are not shown).

FIG. 10 shows three pairs of first stepped planetary gears 8, 10 each having in between a small step wheel 6 of second stepped planetary gears. In FIG. 10 are shown the large step wheels 4 of the second stepped planetary gears which engage the central sun gear 2. The ring gear 12 engages a total of six small step wheels 10 of the first stepped planetary gears. The elevated number of engagement places acts positively on the transmission quality and load capacity. The sun gear 2 has relatively large diameter and combined with a driven central shaft 20 of hollow design (FIG. 11) makes a large central passage possible. Depending on the load and speed ratio requirements, it is also naturally possible to provide more than three pairs of stepped planetary gears.

Figure 11:
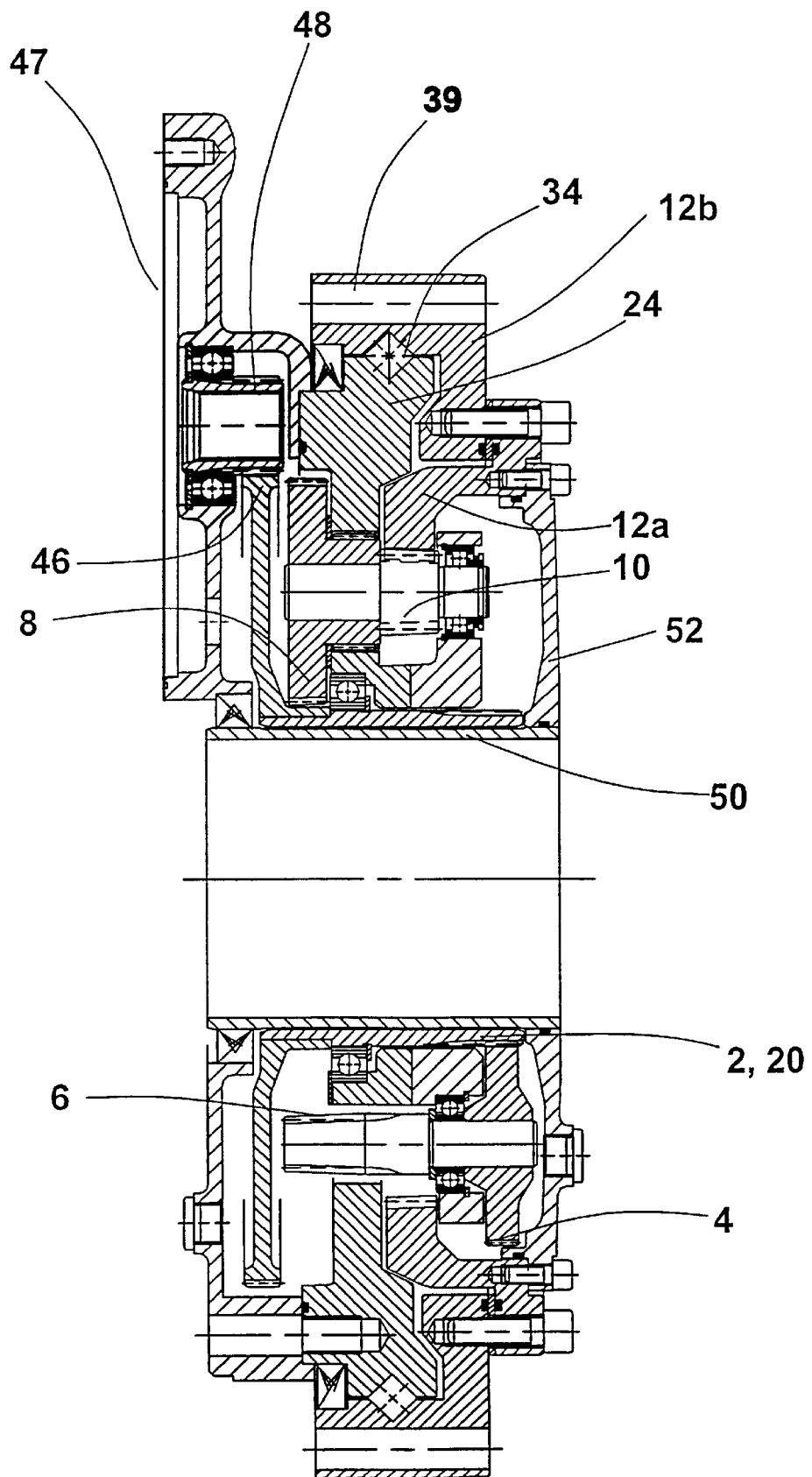
FIG. 11 is a section through a gear designed according to the invention with an eccentrically situated spur gear step and a large central passage.

FIG. 11 shows a section of a gear, according to the invention, having such a central passage. The prime mover is eccentrically located on the motor flange 47. The input pinion 48 drives the spur gear 16 non-rotatably connected with the sun gear 2. The spur gear step makes possible, together with the eccentric arrangement of the prime move, an added input gear ratio corresponding to the number of teeth ratio of pinion 48 and spur gear 46. High total speed ratios thus can be attained also with a large central sun gear 2. Likewise, the cylindrical sun gear 2 engages the cylindrical large step wheels 4 of the second stepped planetary gears. The small step wheels 6 of the second stepped planetary gears are of conical design and drive the conical large step wheel 8 of the first stepped planetary gears. By the conical small step wheels 10 of the first stepped planetary gears is driven off the conical ring gear 12. Parts of the housing 52 revolve at the rotational speed of the ring gear 12 which, in the embodiment shown, constitutes the output. The bores 39 in the part 12b of the ring gear with the rolling body race for the main bearing 34 serve to fasten parts to be driven. In this embodiment, the planet carrier 24 is designed stationary and the ring gear 12 rotatable; it is a static gear. The central passage is surrounded by a bushing 50. The latter locks the housing 52 inwardly and prevents damage when cable strands or other parts are passed through the central passage.

Finally, FIGS. 12 and 13 show two views of a first part of a two-part first stepped planetary gear. It has three axially consecutive sections. The gearing pivot 84 serves for passing into a planetary bearing 32 (FIG. 2). The step wheel 10 has helical-cut engaging gears. In the shaft prolongation 82 is integrated a form locking teeth. The engaging gears and the form locking teeth have the same number of teeth. In the transition area from the engaging teeth to the form locking teeth, the tooth gaps have the same position, which can be seen in FIG. 13. The equality of position offers advantages in the production of the teeth, since the tooth gaps of the adjoining teeth give an outlet for processing tools. Because of the equal number of teeth, it is not necessary in the assemblage to take into account a position coordination of engaging and form locking teeth.

In all embodiments, it has been provided that the teeth play, of all teeth in which conical wheels are involved, is adjustable by adequately adapted spacers or adjusting rings or can be eliminated by spring arrangements 64.

Depending on the desired properties or the desired speed ratio, other designs, especially of the planet wheels, are naturally conceivable (e.g. traversing planets, planets with equal number of teeth).

A design is also possible that can be very easily produced in which all planetary axles extend parallel to the gear main axle and all wheels have cylindrical design. The sun gear 2 of cylindrical design offers the advantage of an insensitivity of the teeth play of the input step, namely, sun gear/step wheels of the second stepped planetary gears, against a relative axial displacement of the wheels involved.

REFERENCE NUMERALS 2 sun gear
4 large step wheel of second planetary gear
6 small step wheel of second planetary gear
8 large step wheel of first planetary gear
10 small step wheel of first planetary gear
12 ring gear
12a internally teeth part of the ring gear
12b ring gear part with rolling body race
14 connecting line
16 connecting line
18 angle
20 driven central shaft
22 bearing
24 planet carrier
26 spacers
28 bearing
30 bearing
32 bearing
34 main bearing
36 spacer
38 threaded bore
39 bore
40 seal
42 bolts
43 through bores
44 central line
46 spur gear
47 motor flange
48 pinion
50 bushing
52 housing
54 spacers
56 coil spring
58 bushing
60 threaded pin
62 bore
64 spring arrangement
66 nut (n)
68 sleeve with collar
70 disc
72 snap ring
74 lid
78 snap ring
82 shaft prolongation
84 bearing pivot

What is claimed is:

1. The planetary gear having a sun gear (2) connected with a driven central shaft (20) defining an axis (44), a ring gear (12), a group of first stepped planetary gears (8, 10) each having a large and a small gear, a group of second stepped planetary gears (4, 6) each having a large and a small gear wherein all stepped planetary gears are supported in a common planet carrier (24), the number of the second stepped planetary gears (4, 6) corresponding to a half the number of the first stepped planetary gears (8, 10), the large gears (4) of said second stepped planetary gears engage said sun gear (2), the small gears (6) of said second stepped planetary gears engage simultaneously one pair of adjacent large gears (8) of said first stepped planetary gears, all small gears (10) of said first stepped planetary gears engage said ring gear (12), said planet carrier (24) being a supporting element for said first and second stepped planetary gears (4, 6, 8, 10) and said ring gear (12) being an output gear.

2. The planetary gear according to claim 1, wherein connecting lines (14, 16) from the wheel central point of a small gear (6) of the second stepped planetary gears to the wheel central points of the two adjacent large gears (8) of the first stepped planetary gears form an angle (18) of between 180° and 195°.

3. The planetary gear according to claim 1, wherein said ring gear (12) defines gear teeth forming a conical shape.

4. The planetary gear according to claim 3, wherein at least said small gears (10) of said first stepped planetary gears are of cylindrical form and the axles of rotation of said first stepped planetary gears (8, 10) are radially inclined toward the axis (44) forming an angle therewith.

5. The planetary gear according to claim 3, wherein said small gears (10) of said first stepped planetary gears have a conical form and the axles of rotation of said first stepped planetary gears are parallel to the axis (44).

6. The planetary gear according to claim 1, wherein said ring gear (12) defines teeth forming an internally cylinder.

7. The planetary gear according to claim 6, wherein said small gears (10) of said first stepped planetary gears are of conical design and the axles of rotation of said first stepped planetary gears (8, 10) are radially inclined toward a gear main axle forming an angle therewith.

8. The planetary gear according to claim 5, wherein said large gears (8) of said first stepped planetary gears are of conical form and have the same conical orientation as said small gears (10) of said first stepped planetary gears.

9. The planetary gear according to claim 5, wherein said large gears (8) of said first stepped planetary gears are of conical form and have a conical orientation opposite to said small gears (10) of said first stepped planetary gears.

10. The planetary gear according to claim 1, wherein said large gears (4, 8) of at least one group of said stepped planetary gears are of substantially cylindrical form and the sun gear (2) and the small gears (6) of said second stepped planetary gears engaging said large gears (4, 8) of said least one group are of conical form.

11. The planetary gear according to claim 1, wherein all planetary axles and the axis (44) intersect at a common point.

12. The planetary gear according to claim 1, wherein at least one group of said stepped planetary gears meshing with each other is helical cut.

13. The planetary gear according to claim 12, wherein said large and small gears of said at least one group of stepped planetary gears are helical cut and the helix angles of the teeth of said large and small gears have equal sense of direction.

14. The planetary gear according to claim 13, wherein the ratio of the tangent of the helix angles is substantially equal to the diameter ratio of the pitch circle of said large and small gears of said at least one group of stepped planetary gears.

15. The planetary gear according to claim 1, wherein said second stepped planetary gears (4, 6) and said first stepped planetary gears (8, 10) are axially substantially coincident.

16. The planetary gear according to claim 15, wherein said large gears (8) of said first stepped planetary gears are situated axially on one side of said ring gear (12) and said large gears (4) of said second stepped planetary gears are situated axially on the other side of said ring gear (12).

17. The planetary gear according to claim 1, wherein said second stepped planetary gears (4, 6) are supported in said planet carrier (24) by a floating support of said small gears (6) of said second stepped planetary gears (4, 6) between each two large gears (8) of said first stepped planetary gears (8,10) and each by one other with an axial distance from a bearing (22).

18. The planetary gear according to claim 1, wherein said driven central shaft (20) is supported by a floating support of said sun gear (2) between said large gears (4) of said second stepped planetary gears and by one other with an axial distance from a bearing (22).

19. The planetary gear according to claim 1, wherein between said supporting element and said output gear, a main bearing (34) is situated which absorbs operating forces.

20. The planetary gear according to claim 19, wherein the main bearing (34) has rolling body races incorporated directly into said planetary carrier (24) and a part (12b) to which the ring gear (12) is connected.

21. The planetary gear according to claim 20, wherein said ring gear (12) has a first inner toothed part (12a) and a second part (12b) with incorporated said rolling body races.

22. The planetary gear according to claim 19, wherein said main bearing (34) is a cross roller bearing.

23. The planetary gear according to claim 1, wherein the relative rotating position of said large and small gears of one of said stepped planetary gears is adjustable during the assemblage by adjustment and affixedly attaching one of said large and small gears upon a shaft firmly connected with the other said gear.

24. The planetary gear according to claim 23, wherein the relative rotating position of said large and small gears of said first stepped planetary gears is adjustable by means of a releasable flange connection in which fastening elements (42) have tangential play in associated through bores (43).

25. The planetary gear according to claim 24, wherein the number of teeth of said adjustable gear (8) cannot be integrally divided by the number of said through bores (43).

26. The planetary gear according to claim 1, wherein one of said first and second stepped planetary gears (4, 6, 8, 10) has a splined shaft prolongation (82) for interlocking connection with an inner splined hub of the large gears (4, 8), the splines of said shaft prolongation having the same number of teeth as the meshing teeth of said small gears (6, 10) and tooth gaps of both teeth are substantially equal in position in a transition area.

27. The planetary gear according to claim 1, wherein in at least one group of the stepped planetary gears (8, 10, 4, 6), the number of teeth of said large gears (8, 4) can be divided integrally by the number of teeth of said small gears (10, 6) of said at least one group of the stepped planetary gears.

28. The planetary gear according to claim 1, wherein said driven central shaft (20) is hollow.

29. The planetary gear according to claim 1, wherein more than two pairs of said first stepped planetary gears (8, 10) simultaneously engage said ring gear (12).

30. The planetary gear according to claim 1, wherein connecting lines of gear central points of two of said first stepped planetary gears, to the gear central point of said sun gears form an angle of less than 90°.

31. The planetary gear according to claim 1, wherein said central shaft (20) connected with said sun gear (2) is driven by an eccentrically situated spur gear step (46, 48).

32. The planetary gear according to claim 28, wherein one bushing (50) is situated in said hollow central shaft (20).

33. The planetary gear according to claim 5, wherein said first stepped planetary gears (8, 10) are respectively axially movably supported along the axles of the first stepped planetary gears (8, 10) in the planet carrier (24) and a spring element (56) for transmission of an axial force that compensates the teeth play is situated between said first stepped planetary gear and the planet carrier.

34. The planetary gear according to claim 33, wherein said spring element is a prestressable coil spring (56) which is situated in a bore (62) in said first stepped planetary gear (8, 10) between an element (70) fastened in said first stepped planetary gear and one other supporting element (68) axially coupled with said planet carrier (24), and an adjusting device is provided for setting a maximum pitch of said spring.

* * * * *